United States Patent [19]
Umida

[11] Patent Number: 5,489,829
[45] Date of Patent: Feb. 6, 1996

[54] PARAMETER IDENTIFIER

[75] Inventor: Hidetoshi Umida, Kawasaki, Japan

[73] Assignee: Fuji Electric Co., Ltd., Kawasaki, Japan

[21] Appl. No.: 171,467

[22] Filed: Dec. 22, 1993

[30] Foreign Application Priority Data

Dec. 25, 1992 [JP] Japan .................. 4-359574

[51] Int. Cl.⁶ ...................... G05B 11/42
[52] U.S. Cl. ............ 318/561; 318/608; 364/149
[58] Field of Search ............... 318/561, 434, 318/606–610; 364/149–151

[56] References Cited

U.S. PATENT DOCUMENTS

| 5,099,197 | 3/1992 | Hauck et al. | 324/161 |
| 5,144,549 | 9/1992 | Youcef-Toumi | 364/150 X |
| 5,339,016 | 8/1994 | Thoen | 318/610 |

FOREIGN PATENT DOCUMENTS

| 2343511 | 3/1975 | Germany. |
| 3815530 | 11/1989 | Germany. |
| 2-228285A | 9/1990 | Japan. |

OTHER PUBLICATIONS

Gerhard Kreisselmeier, "Adaptive Observers with Exponential Rate of Convergence", *IEEE Transactions on Automatic Control*, vol. AC–22, No. 1, Feb. 1977, pp. 2–8.
Z. Iwai, "Problems in Adaptive Observers", System and Control, *Japanese Association of Automatic Control Engineers*, vol. 28, No. 6, 1984, pp. 354–363.
msr, Berlin 29, 1986, 5, S. 218–220, "Multimodellansatz zur Indentifikation von Regelstrecken mit schnellen Parameteränderungen", Unbehauen, et al.
Automatisierungstechnische Praxis atp 31, 1989, 10, S. 475–480, "Methoden der Prozeßführung mit Simulationsmodellen", H. Schuler.
msr, Berlin 29, 1986, 7, S. 298–301, "Adaptive Drehzahlregelung eines Gleichstromantriebs mit Mikrorechner 1", Müller, et al.

*Primary Examiner*—Brian Sircus
*Attorney, Agent, or Firm*—Spencer, Frank & Schneider

[57] ABSTRACT

A parameter identifier which estimates parameters of a plant includes a model, a subtracter, a delay circuit, and a parameter adaptive mechanism. Disturbances are assumed to be represented by an impulse train consisting of a finite number (=m) of impulses. The model estimates n state variables and the output of the plant on the basis of the input and output of the plant. The subtracter outputs the error between the output of the plant and the estimated output. The delay circuit delays the state variables outputted from the model by N ($\leq n+m+1$) samples before applying them to the parameter adaptive mechanism. The parameter adaptive mechanism calculates the parameters on the basis of the products of the error and the delayed state variables. The number N is determined such that the effect of the disturbance on the error disappears in N samples from the beginning of the disturbance. This makes it possible for the parameter adaptive mechanism to output estimated parameters free from the influence of the disturbance. The present invention can also be applied to multi-inertia machinery.

4 Claims, 7 Drawing Sheets

5,489,829

PARAMETER IDENTIFIER

BACKGROUND OF THE INVENTION

1. Field of the Invention

The present invention relates to a parameter identifier used to identify the mechanical time constant (that is, the moment of inertia) of a motor or the like.

2. Description of Related Art

The following conventional techniques are known in the art of parameter identification.

(1) A method for designing an adaptive observer taking account of external disturbance by extending state equations of a plant. This method is taught by Z. Iwai, "Problems in Adaptive Observers", SYSTEM AND CONTROL, Vol. 28, No. 6, pp. 354–363, 1984, Japanese Association of Automatic Control Engineers.

This method supposes a plant expressed by the following equations corresponding to equations (5.1a) and (5.1b) of the above-mentioned reference.

$\dot{x}(t)=Ax(t)+bu(t)+fw(t)$, $x(0)=x_0$ $y(t)=c^T x(t)$

In addition, a disturbance is given by the following equations corresponding to equations (5.2a) and (5.2b) of the reference.

$\dot{w}(t)=Dw(t)$, $w(0)=w_0$ $w(t)=d^T w(t)$

From these equations, an (n+k) order extended system expressed by the following equations corresponding to equations (5.3a) and (5.3b) of the reference is obtained.

$\dot{\bar{x}}(t)=\bar{A}\bar{x}(t)+\bar{b}u(t)$ $y(t)=\bar{c}^T \bar{x}(t)$ where n is the order of the plant and k is the order of the disturbance.

The method is arranged into a Kreisselmeier type adaptive observer by using a state variable filter expressed by the following equation corresponding to equation (5.8) of the reference.

$\dot{z}_i(t)=\bar{K}^T z_i(t)+\bar{c}u_{i-1}$, $z_i(0)=0$, $i=1,2(u_0=y, u_1=u)$ In addition, an error equation is given by the following equation corresponding to equation (5.9).

$e(t)=g(t)^T \zeta(t)+f_3(t)$ $g(t)^T=[z_1(t)T\Lambda, Z_2(t)T\Lambda]$ $\zeta(t)^T=[(a-\hat{a}(t))^T, (b-\hat{b}(t))^T]$ $f_3(t)=\bar{c}^T e^{Kt}\bar{x}(0)$ (2) A parameter identification method disclosed in Japanese Patent Application Laying-Open No. 228285/1990 applied by the present assignee. In identifying the mechanical time constant of a motor, this application assumes that the load disturbance torque is constant or changes stepwise, and identifies the mechanical time constant on the basis of changes in the speed and changes in the driving torque.

FIG. 1 shows a functional block diagram of the second conventional system. In this system, a parameter identifier 503 identifies the mechanical time constant on the basis of the changes in the speed ω(t), that is, the output y(t) of a motor 502, and the changes in the driving torque τa(t), that is, the input u(t) of the motor 502. Accordingly, if the load disturbance d (t) added to the motor 502 is constant, the state equation in the discrete time system is given by equation (1). In equation (1), $d(p)=d_0$ (constant), p designates a sampling interval, and $T_M$ denotes the mechanical time constant.

$$\begin{aligned}\omega_{(p)} - \omega_{(p-1)} &= \{\omega_{(p-1)} + T_M^{-1}(\tau_{a(p-1)} + d_{(p-1)})\} - \\ &\quad \{\omega_{(p-2)} + T_M^{-1}(\tau_{a(p-2)} + d_{(p-2)})\} \\ &= \omega_{(p-1)} - \omega_{(p-2)} + T_M^{-1}(\tau_{a(p-1)} - \tau_{a(p-2)})\end{aligned} \quad (1)$$

Although the first conventional technique can identify the parameter (the mechanical time constant) correctly if the disturbance occurs at time 0, the identification error will increase if the disturbance randomly occurs because theparameter is reidentified by the disturbance. The identification error will further increase when the plant undergoes the feedback control by an adaptive mechanism, because the feedback component including the effect of the disturbance is applied to the input of the plant. This presents a problem in that it hinders correct identification.

Although the second conventional system operates correctly when the load torque is constant, because the effect of the load torque is eliminated in that case, the identification error occurs for a stepwise load disturbance because the changes in the speed and driving torque appear in the same sampling interval owing to the effect of an automatic speed regulator.

Generally speaking, the actual load disturbance changes slower than the control signal, and is randomly and repeatedly takes place during the operation. As a result, the identification error is liable to increase. In addition, since the second method is for a single-inertia mechanical system, it cannot be applied to a multiple-inertia mechanical system.

SUMMARY OF THE INVENTION

It is therefore an object of the present invention to provide a parameter identifier which can perform correct and stable parameter identification of a plant when a complicated disturbance is added to the plant, or a multiple-inertia system is employed as a plant.

According to a first aspect of the present invention, there is provided a parameter identifier identifying one or more parameters of an n-order plant including n state variables, the plant being subject to a known disturbance represented by an m-order impulse train, the parameter identifier comprising:

a model estimating the state variables and an output of the plant on the basis of identified parameters, and the input and output of the plant;

a subtracter calculating an error by subtracting the output of the plant from the estimated output of the plant produced from the model;

a delay circuit delaying the state variables produced from the model by N samples, where N is an integer which is not less than 1 or more than (n+m+1); and a parameter adaptive mechanism for adjusting the parameters on the basis of the delayed state variables and the error.

Here, the model may comprise:

a first delay circuit including serially connected (n+m) delay elements, each of which delays the output of the plant by one sample;

first weighting means for obtaining (n+m) weighted linear combinations of the outputs of the delay elements of the first delay circuit, the first weighting means outputting the (n+m) weighted linear combinations as first state variables;

first linear combination means for obtaining a linear combination of the first (n+m) state variables using the parameters identified as coefficients of that linear combination;

a second delay circuit including serially connected (n+m) delay elements, each of which delays the input of the plant by one sample;

second weighting means for obtaining (n+m) weighted linear combinations of the outputs of the delay elements of the second delay circuit, the second weighting means outputting the (n+m) weighted linear combinations as second state variables;

second linear combination means for obtaining a linear combination of the second (n+m) state variables using the parameters identified as coefficients of that linear combination; and a subtracter producing a difference between the output of the first linear combination means and the output of the second linear combination means.

According to a second aspect of the present invention, there is provided a motor system comprising:

a motor which is subject to a load disturbance;

a parameter identifier identifying one or more parameters of the motor including n state variables, the motor being subject to a known disturbance represented by an m-order impulse train; and a regulator producing a torque command from a speed command, the regulator modifying the torque command in accordance with the identified parameters, the parameter identifier including:

a model estimating the state variables and an output of the plant on the basis of identified parameters, and the input and output of the plant;

a subtracter calculating an error by subtracting the output of the plant from the estimated output of the plant produced from the model;

a delay circuit delaying the state variables produced from the model by N samples, where N is an integer which is not less than 1 or more than (n+m+1); and a parameter adaptive mechanism for adjusting the parameters on the basis of the delayed state variables and the error.

Here, the motor may have an elastic output shaft joined to a load, and the disturbance may be applied to the load.

According to the present invention, the parameter identifier includes the model, the subtracter, the delay circuit, and the parameter adaptive mechanism. The disturbance is assumed to be represented by an impulse train consisting of a finite number (=m) of impulses. The model estimates the state variables and the output of the plant on the basis of the input and output of the plant. The subtracter outputs the error between the output of the plant and the estimated output. The delay circuit delays the state variables produced from the model by N samples before applying them to the parameter adaptive mechanism. The parameter adaptive mechanism calculates the parameters on the basis of the products of the error and the delayed state variables. The number N is determined such that the effect of the disturbance on the error disappears in N samples from the beginning of the disturbance. This makes it possible for the parameter adaptive mechanism to output estimated parameters free from the influence of the disturbance. In addition, the present invention can be applied to multi-inertia machinery.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

FIRST EMBODIMENT

Figure 1:
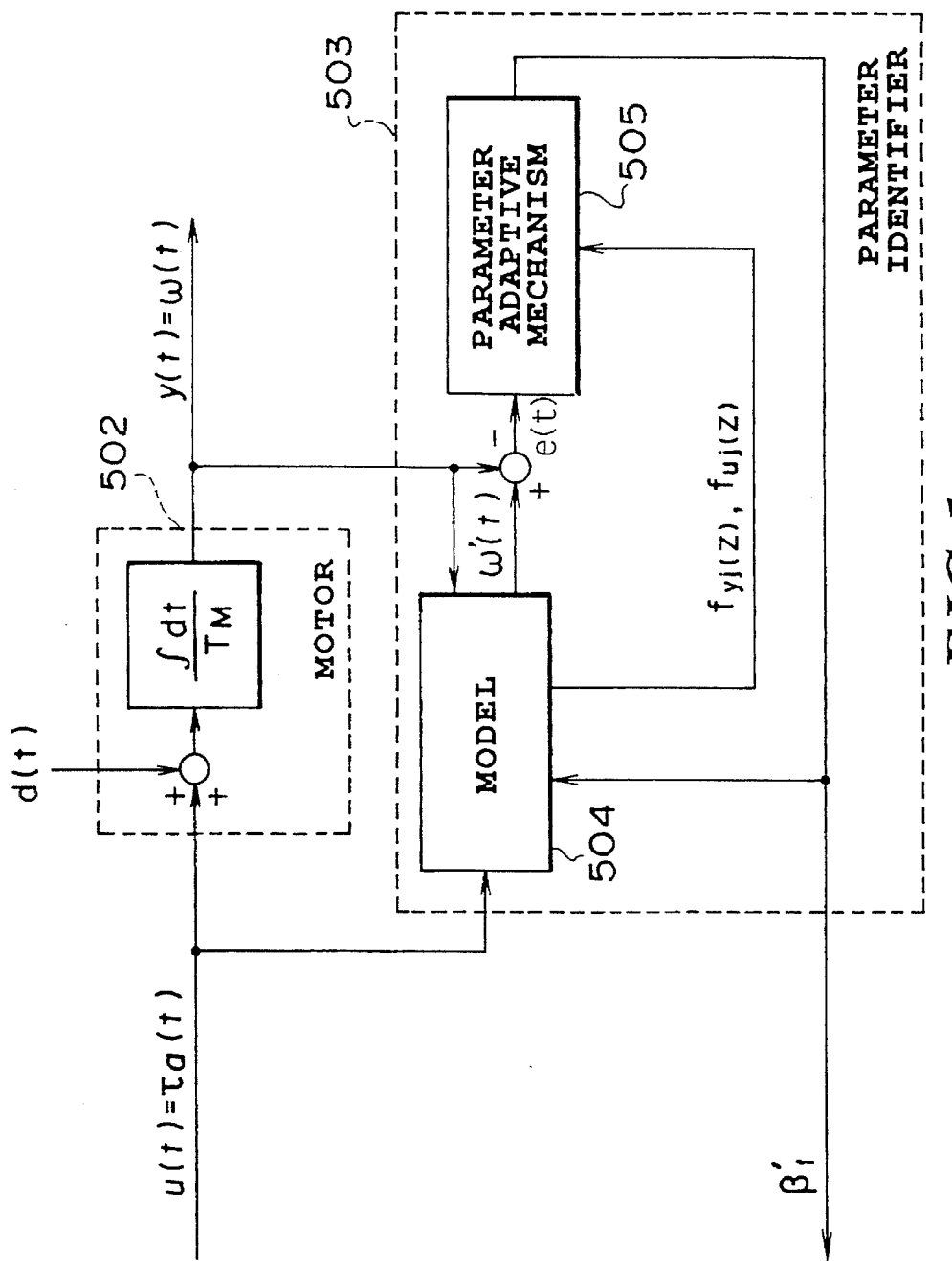
FIG. 1 is a block diagram showing a conventional parameter identifier.
Figure 2:
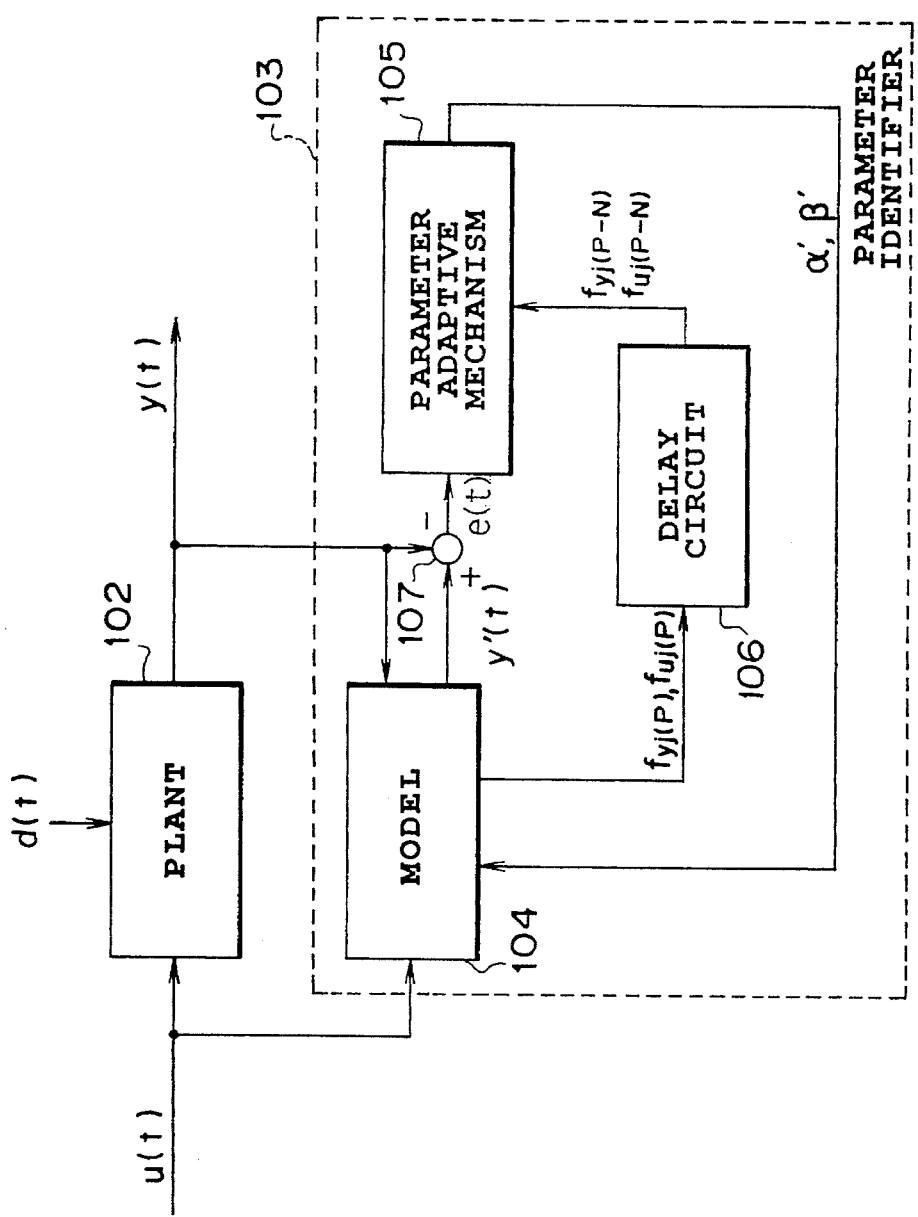
FIG. 2 is a block diagram showing a first embodiment of a parameter identifier in accordance with the present invention.

FIG. 2 shows a first embodiment of a parameter identifier in accordance with the present invention. In this figure, the reference numeral 102 designates a plant whose parameters are to be identified. The plant 102 is provided with an input u (t) and an m-order disturbance d(t), and produces an output y(t). The input u(t) and the output y(t) are inputted to a model 104, which estimates state variables and the output of the plant 102, and produces the estimated state variables $f_{yj}$ and $f_{uj}$ (j=1–n), and the estimated output y' (t). The output y(t) and the estimated output y' (t) are supplied to an adder 107, which outputs the difference e(t) (=y'(t)–y(t)) of the two as an error signal.

The estimated state variables $f_{yj}$ and $f_{uj}$ are delayed by a delay circuit 106 by N samples, and the delayed state variables $f_{yj(p-N)}$ and $f_{uj(p-N)}$ are supplied to a parameter adaptive mechanism 105. The parameter adaptive mechanism 105 also receives the error signal e(t), and produces identified parameters α' and β', which are fed back to the model 104. The elements 104–107 constitute a parameter identifier 103.

Figure 3A:
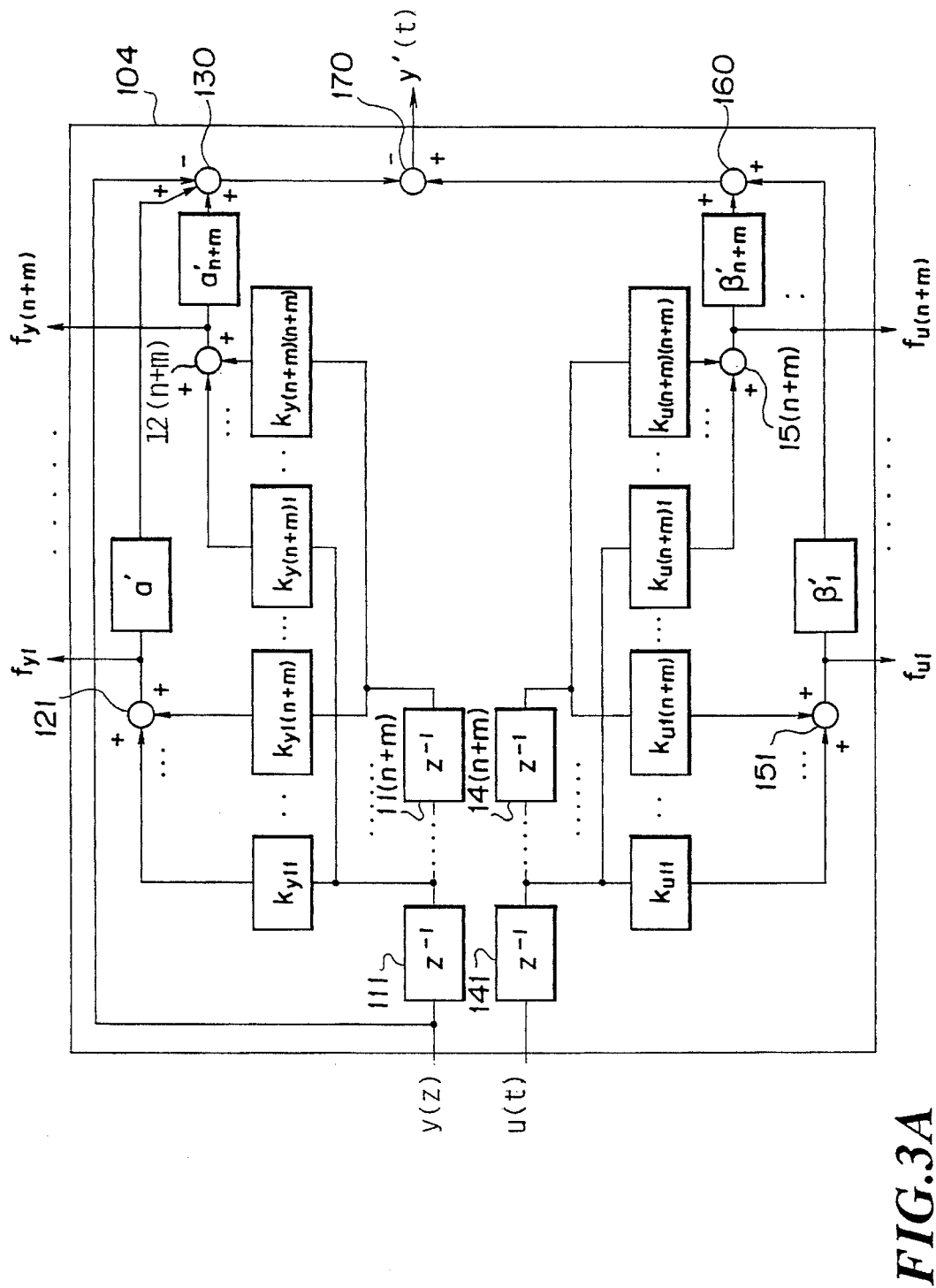
FIG. 3A is a block diagram showing the model 104 of the first embodiment as shown in FIG. 2.

FIG. 3A is a block diagram showing the model 104. The output y(t) of the plant 102 undergoes the Z-transform, and is passed through (n +m) delay elements 111–11 (n+m), where n is the order of the plant 102, that is, the number of state variables, and m is the order of the disturbance d(t). The output of the first delay element 111 is multiplied by (n+m) weighting coefficients $k_{y11}, k_{y21}, \ldots, k_{y(n+m)1}$, the output of the second delay element is multiplied by (n+m) weighting coefficients $k_{y12}, k_{y22}, \ldots, k_{y(n+m)2}$, and the output of the (n+m)-th delay element 11 (n+m) is multiplied by (n+m) weighting coefficients $k_{y1(n+m)}, k_{y2(n+m)}, \ldots, k_{y(n+m)(n+m)}$. Furthermore, the outputs of respective delay elements 111–11 (n+m) multiplied by the first delay coefficients $k_{y11}, k_{y12}, \ldots, k_{y1(n+m)}$ are added by an adder 121, and the output of the adder is further multiplied by an estimated parameter $\alpha'_1$. Likewise, the outputs of respective delay elements multiplied by the second delay coefficients $k_{y21}, k_{y22}, \ldots, k_{y2(n+m)}$ are added by an adder, and the output of the adder is further multiplied by an estimated parameter $\alpha'_2$, and the outputs of respective delay elements multiplied by the (n+m)-th delay coefficients $k_{y(n+m)1}, k_{y(n+m)2}, \ldots, k_{y(n+m)(n+m)}$ are added by an adder $12(n+m)$, and the output of the adder is further multiplied by an estimated parameter $\alpha'_{n+m}$. The values multiplied by the estimated parameters $\alpha'_1 - \alpha'_{n+m}$ are added by an adder 130, which subtracts y(Z) from the added result. The outputs of the adders 121–12(n+m) are estimated state variables $f_{y1} - f_{y(n+m)}$.

The input u(t) is handled in a similar manner. The input u(t) undergoes the Z-transform, and is delayed by the delay elements 141–14(n+m). The outputs of respective delay elements 141–14(n+m) are multiplied by weighting coefficients $k_{u11} - k_{u(n+m)(n+m)}$, and are added by adders 151–15(n+m). The outputs of the adders 151–15(n+m) are multiplied by parameters $\beta'_1 - \beta'_{n+m}$, and are added by an adder 160. Here, it should be noticed that the adder 160 does not subtract the input u(Z) from the added result. The outputs of respective adders 151–15(n+m) are estimated state variables $f_{u1} - f_{u(n+m)}$.

The output of the adder 130 is subtracted from the output of the adder 160 by an adder 170, which produces the result as the estimated output y'(t).

Figure 3B:
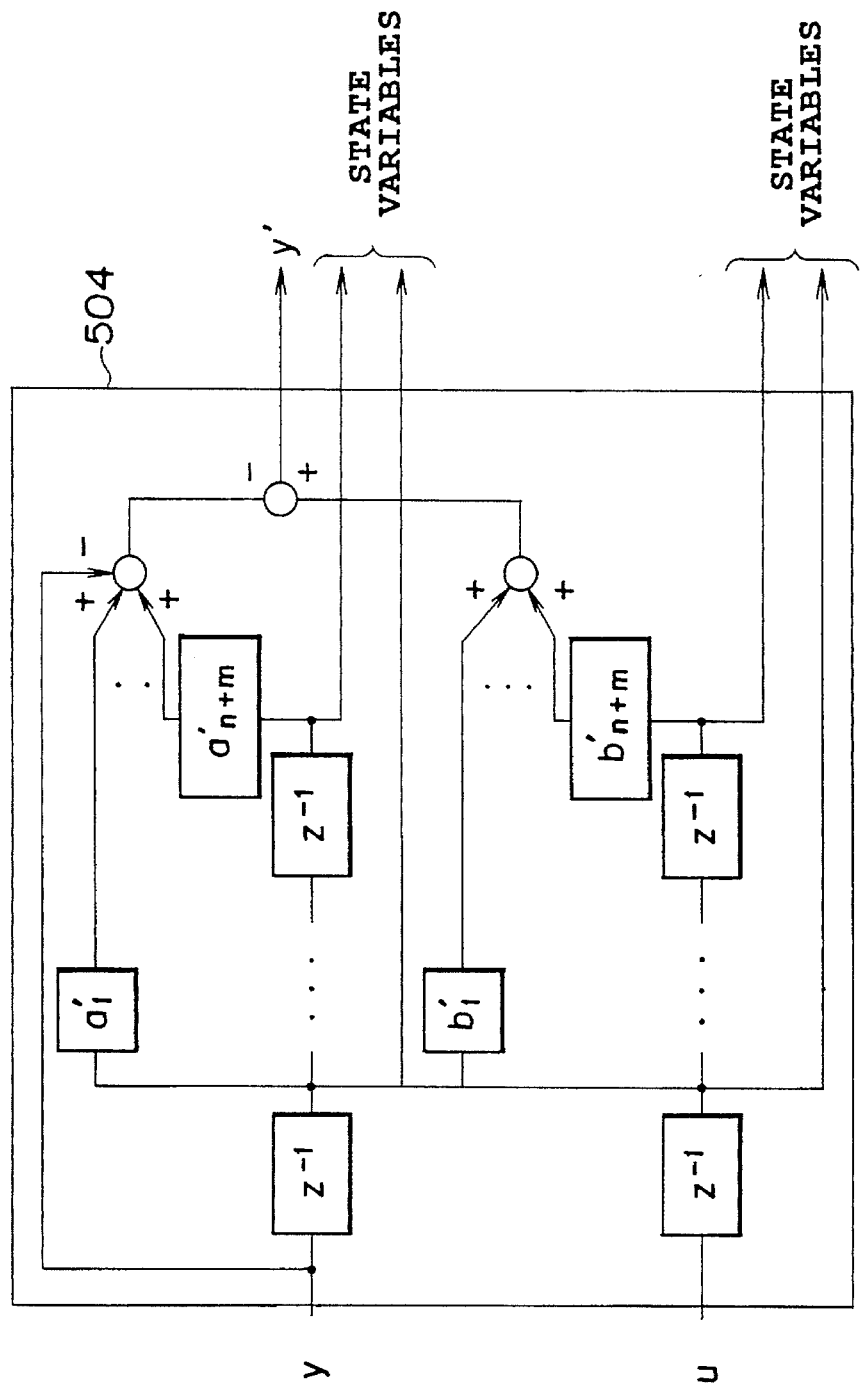
FIG. 3B is a block diagram showing the model 504 of the conventional parameter identifier shown in FIG. 1.

The model 104 in accordance with the present invention differs from the conventional model 504 as shown in FIG. 3B in that it multiplies weighting coefficients $k_{y11} - k_{y(n+m)(n+m)}$ and $k_{u11} - k_{u(n+m)(n+m)}$. This makes it possible to reduce the correlation between the state variables and the error signal e(t).

Next, details of the parameter identifier 103 will be described.

The relationship between the input u(t) and the output y(t) of the plant 102 is transformed into the relationship in a discrete time system whose sampling interval is T, and is expressed by equation (2) using transfer functions, when the characteristic of the disturbance d (t) is known.

$$y(z) = \frac{B(z)}{A(z)} u(z) + \quad (2)$$

$$\frac{C(z)}{A(z)} \cdot \frac{d_{00}z^m + d_{01}z^{m-1} + \ldots + d_{0m-1}z + d_{0m}}{D(z)}$$

$$= \frac{B(z)}{A(z)} u(z) + \frac{C(z)}{A(z)} \cdot \frac{\sum_{i=0}^{m} d_{0i}z^{m-i}}{D(z)}$$

where, $z = e^{sT}$ is the z operator, the integer m is the order of the disturbance. The second term of the right-hand side of equation (2) is the disturbance, and $d_{0i}$ are its initial values. A(z), B(z) and C(z) of equation (2) are n-order polynomials of z, and D(z) is an m-order polynomial of z. Here, B(z)/A(z) is a transfer function from the input u(z) to the output y(z) of the plant 102, 1/D(z) is a transfer function from an impulse train representing the disturbance d(t) to the disturbance d(t), and C(z)/A(z) is a transfer function of the plant 102 for the disturbance d(t). By reducing the right-hand side to a common denominator, equation (3) is obtained.

$$y(z) = \frac{D(z)B(z) \cdot u(z) + C(z) \sum_{i=0}^{m} d_{0i}z^{m-i}}{A(z)D(z)} \quad (3)$$

Expanding A(z)D(z) of the denominator, and D(z)B(z) and C(z) of the numerator of equation (3) into polynomials of z gives equations (4)–(6).

$$A(z)D(z) = 1 \cdot z^{n+m} + a_1 z^{n+m-1} + \ldots + a_{n+m}z^0 \quad (4)$$

$$= z^{n+m} + \sum_{i=1}^{n+m} a_i z^{n+m-i}$$

$$D(z)B(z) = b_0 z^{n+m} + \ldots + b_{n+m-1} \cdot z + b_{n+m} \quad (5)$$

$$= \sum_{i=0}^{n+m} z^{n+m-i}$$

$$C(z) = c_0 z^n + \ldots + c_{n-1}z^1 + c_n = \sum_{i=0}^{n} c_i z^{n-i} \quad (6)$$

In equations (4)–(6), $a_1 - a_{n+m}$, $b_0 - b_{n+m}$, and $c_0 - c_n$ are coefficients, the integer m is the order of the disturbance d(t), that is, the number of impulses required to define the disturbance d(t), and the positive integer n is the order of the plant 102.

By dividing the denominator and numerator of the right-hand side of equation (3) by $z^{n+m}$, the order of the numerator becomes equal to or less than that of the denominator as shown by equation (7). In addition, equation (8) is obtained by canceling the denominator of equation (7).

$$y(z) = \frac{\left(\sum_{i=0}^{n+m} b_i z^{n+m-i}\right) u(z)}{z^{n+m} + \sum_{i=1}^{n+m} a_i z^{n+m-i}} + \frac{\left(\sum_{i=0}^{n} c_i z^{n-i}\right)\left(\sum_{i=0}^{m} d_{0i} z^{m-i}\right)}{z^{n+m}} \quad (7)$$

$$= \frac{\left(\sum_{i=0}^{n+m} b_i z^{-i}\right) u(z) + \left(\sum_{i=0}^{n} c_i z^{-i}\right)\left(\sum_{i=0}^{m} d_{0i} z^{-i}\right)}{1 + \sum_{i=1}^{n+m} a_i z^{-i}}$$

$$\left(1 + \sum_{i=0}^{n+m} a_i z^{-i}\right) y(z) = \quad (8)$$

$$\left(\sum_{i=0}^{n+m} b_i z^{-i}\right) u(z) + \left(\sum_{i=0}^{n} c_i z^{-i}\right)\left(\sum_{i=0}^{m} d_{0i} z^{-i}\right)$$

In the conventional basic design method, parameters $a_i$ and $b_i$ are obtained using $z^{-i}y(z)$ and $z^{-i}u(z)$ as state variables as shown in FIG. 3B. In the present invention, however, state variables are obtained as linear combinations of $z^{-i}y(z)$ and $z^{-i}u(z)$.

For example, state variables $f_{yj}(z)$ and $f_{uj}(z)$ given by equations (9) and (10) are generated from the input u and output y by applying a bilinear transformation on a continuous system, and state variables $f_{yj}(z)$ and $f_{uj}(z)$ given by equations (11) and (12) are derived from the approximation of $s \approx (1-z^{-1})/T$.

$$f_{yj}(z) = \left(\frac{1+z^{-1}}{2}\right)^{q-j} (1-z^{-1})^j y(z) \quad (9)$$

$$f_{uj}(z) = \left(\frac{1+z^{-1}}{2}\right)^{q-j} (1-z^{-1})^j u(z) \quad (10)$$

$$f_{yj}(z) = (1-z^{-1})^j y(z) \quad (11)$$
$$f_{uj}(z) = (1-z^{-1})^j u(z) \quad (12)$$

Equations (9)–(12) are reduced to equations (13) and (14) using the weighting coefficients $k_{yji}$ and $k_{uji}$ as shown in FIG. 3A.

$$f_{yj}(z) = \sum_{i=1}^{n+m} k_{yji} z^{-i} y(z) \quad (13)$$

$$f_{uj}(z) = \sum_{i=1}^{n+m} k_{uji} z^{-i} u(z) \quad (14)$$

The state variables $f_{yj}(Z)$ and $f_{uj}(Z)$ of Equations (13) and (14) are linearly combined as Equations (15) and (16) using the parameters $\alpha_1 - \alpha_{n+m}$ and $\beta_1 - \beta_{n+m}$.

$$\left(1 + \sum_{i=0}^{n+m} a_i z^{-i}\right) y(z) = \alpha_1 f_{y1}(z) + \alpha_2 f_{y2}(z) + \ldots + \alpha_r f_{yr}(z) = \quad (15)$$

$$y(z) + \{\alpha_1 f_{y1}(z) + \alpha_2 f_{y2}(z) + \ldots + \alpha_r f_{yr}(z) - y(z)\}$$

$$\left(\sum_{i=0}^{n+m} b_i z^{-i}\right) u(z) = \beta_0 f_{u0}(z) + \beta_1 f_{u1}(z) + \ldots + \beta_r f_{ur}(z) \quad (16)$$

where r is the number of the state variables, which is equal to or less than n+m. Here, the term of $z^0$ in $\{\alpha_1 f_{y1}(z) + \alpha_2 f_{y2}(z) + \ldots + \alpha_r f_{yr}(z) - y(z)\}$ of equation (15) becomes zero. The coefficients $\alpha_1$–$\alpha_r$ and $\beta_0$–$\beta_r$ in equations (15) and (16) are the parameters to be identified by the parameter identifier 103 of the present invention. By substituting equations (15) and (16) into equation (8), equation (17) is obtained.

$$y(z) = -\{\alpha_1 f_{y1}(z) + \alpha_2 f_{y2}(z) + \ldots + \alpha_r f_{yr}(z) - y(z)\} + \quad (17)$$

$$\{\beta_0 f_{u0}(z) + \beta_1 f_{u1}(z) + \ldots + \beta_r f_{ur}(z)\} +$$

$$\left(\sum_{i=0}^{n} c_i z^{-i}\right)\left(\sum_{i=0}^{m} d_{0i} z^{-i}\right)$$

The model 104 estimates the output y(t) expressed by equation (17) using identified parameter values $\alpha'_1$–$\alpha'_{n+m}$ and $\beta'_1$–$\beta'_{n+m}$, and produces an estimated output y'(z) given by equation (18) under the condition that the initial values of the disturbance $d_{0i}$ are zero (that is, $d'_{0i}=0$). This assumption is used because the disturbance d(t) cannot be detected directly.

$$y'(z) = -\{\alpha'_1 f_{y1}(z) + \alpha'_2 f_{y2}(z) + \ldots + \alpha'_r f_{yr}(z) - y(z)\} + \quad (18)$$

$$\{\beta'_0 f_{u0}(z) + \beta'_1 f_{u1}(z) + \ldots + \beta'_r f_{ur}(z)\}$$

Next, the difference between the estimated output y'(z) of the model 104 given by equation (18) and the actual output y(z) of the plant 102 given by equation (17) is calculated, and is given as the error signal e(z).

$$\begin{aligned} e(z) &= y'(z) - y(z) \quad (19) \\ &= -\sum_{i=1}^{n+m} (\alpha'_i - \alpha_i) f_{yi}(z) + \sum_{i=0}^{n+m} (\beta'_i - \beta_i) f_{ui}(z) + \\ &\quad \left(\sum_{i=0}^{n} c_i z^{-i}\right)\left(\sum_{i=0}^{m} d_{0i} z^{-i}\right) \end{aligned}$$

The third term of the right-hand side of equation (19), that is, the disturbance term, appears up to (n+m) sampling intervals from the beginning of the disturbance, as impulses having the initial values of the disturbance, and after that, it disappears from equation (19). In other words, impulses of the disturbance can appear in the error signal e(z) during N sampling intervals equal to or less than (n+m) beginning from the occurrence of the disturbance.

The identified parameters are controlled by correlations between the error e(z) and the state variables $f_{yj}$ and $f_{uj}$. Thus, if the error and the state variables which are under the influence of the disturbance, are simultaneously used to obtain the correlations, the identification of the parameters will suffer from the disturbance. In contrast, the adjustment of the identified parameters can be achieved without influence of the disturbance if the products of the error e and state variables $f_{yj}$ and $f_{uj}$ are taken under the following rules:

(1) If the error e(z) includes the impulses of the disturbance, that is, if the error is being subject to the influence of the disturbance, the state variables that are not being changed by the disturbance must be selected to be multiplied.

(2) If the error does not include the impulses of the disturbance, that is, if the error is free from the influence of the disturbance, the state variables that are under the influence of the disturbance may be selected to be multiplied.

Since the error e(z) is expressed by error equation (19), the impulses of the disturbance appear in the error e(z) up to (n+m+1) sampling intervals. In other words, the influence of the disturbance d(t) appears in the error e(z) during N sampling intervals equal to or less than (n+m+1) sampling intervals. Accordingly, if the state variables $f_{yj}$ and $f_{uj}$ are delayed by N samples, the rules mentioned above will be satisfied. Thus, the parameter control is executed in accordance with equations (20) and (21) using the state variables $Z^{-N} f_y$ and $Z^{-N} f_u$, which are delayed by N samples by the delay circuit 106.

$$\alpha'_{(p+1)} 32 \; \alpha'_{(p)} + \Gamma_y f_{y(p-N)} \cdot e_{(p)}, \; \alpha' = (\alpha'_1, \ldots, \alpha'_{n+m})^T \quad (20)$$

$$\beta'_{(p+1)} = \beta'_{(p)} + \Gamma_u f_{u(p-N)} \cdot e_{(p)}, \; \beta' = (\beta'_0, \ldots, \beta'_{n+m})^T \quad (2)$$

where p is a sampling time, $\Gamma_y$ is a gain matrix of $(n+m)\times(n+m)$, and $\Gamma_u$ is a gain matrix of $(n+m+1)\times(n+m+1)$.

With this arrangement, let us consider the case where the disturbance d(t) takes place under the condition that all the initial values of the state variables are zero. In this case, even if the disturbance appears in the error e(z) in equation (19) during the sampling intervals 0–N, the parameter identification values do not vary because the delayed state variables $Z^{-N} f_y$ and $Z^{-N} f_u$ are not affected by the disturbance d(z).

In addition, beyond the N sampling intervals, the parameter identification values do not change from the correct values because e(z)=0 (because the influence of the disturbance on the error e(z) is zero) when the parameter identification values are correct.

When the parameter identification values are different from the exact values, they are controlled such that e(z) converges to zero as in the conventional system.

Since the state variables appearing in equations (19)–(21) are a part of the state variables defined in equations (13) and (14), it is enough for the model 104 to output only the state variables used in equations (19)–(21).

In addition, it is obvious that the order of the parameter identifier 103 can be reduced when the orders of the above equations can be decreased by the pole-zero cancellation.

Furthermore, in FIG. 2, the plant 102 is represented by equation (7), the model 104 is represented by equation (18), and the parameter adaptive mechanism 105 is represented by equations (20) and (21).

Figure 4:
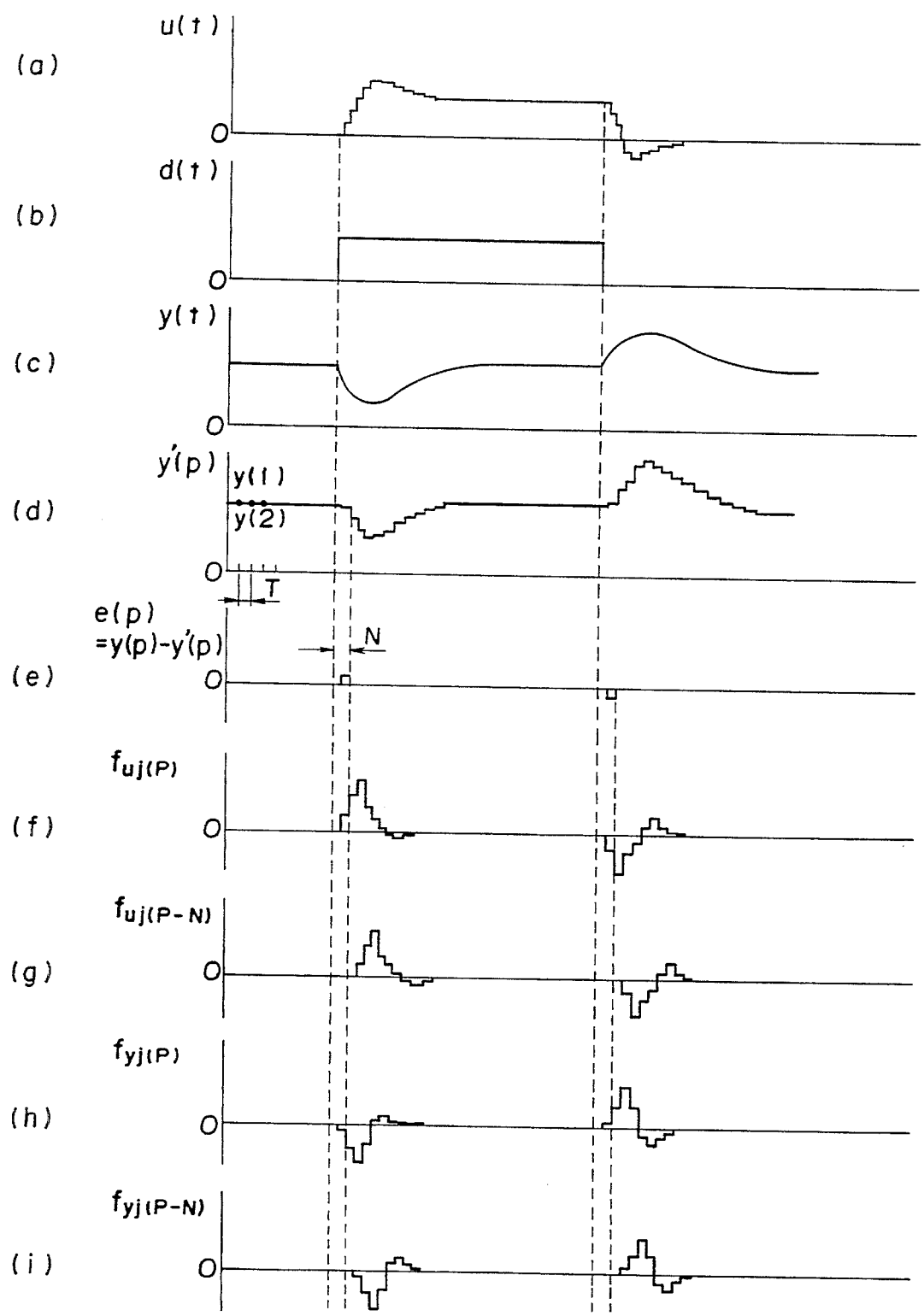
FIG. 4 is a diagram illustrating waveforms associated with the first embodiment.

FIG. 4 illustrates waveforms associated with the first embodiment.

In (a) and (b) of this figure, the input u(t) and the disturbance d(t) having a step-like transition are shown. The output y(t) of the plant 102 equals the estimated value y'(p) of the output y(t) (that is, the error e(p) is zero) as long as the parameter identification is completed (see, (c)–(e) of FIG. 5). If the disturbance d(t) is applied to the system in this state, the estimation error due to the disturbance d(t) appears in the error e(p) during the sampling intervals N beginning from the application of the disturbance d(t). Here, the number N of sampling intervals during which the impulses of disturbance appear in the error e(z) is equal to or less than n+m+1, because the order associated with $d_{0i}$ in equation (19) is n+m. Accordingly, the delay circuit 106 delays the state variables $f_{uj}$ and $f_{yj}$ by N samples as shown in (f)–(i) of FIG. 4, and outputs the delayed state variables $f_{uj(p-N)}$ and $f_{yj(p-N)}$.

It must be noticed here that although the correlation between the non-delayed state variable $f_{uj(p)}$ and the error e(p) and the correlation between the non-delayed state variable $f_{yj(p)}$ and the error e(p) are not zero, the correlation between the delayed state variable $f_{uj(p-N)}$ and the error e(p) and the correlation between the delayed state variable $f_{yj(p-N)}$ and the error e(p) are zero. As a result, the parameters identified on the basis of the products between the delayed state variables and the error are not influenced by the disturbance.

The parameter identifier in accordance with the present invention differs from the conventional ones in the following:

(1) Each state variable is obtained by linearly combining the weighted outputs of the delayed elements.

(2) Each state variable is delayed by N samples, where N is equal to or less than (n+m+1), so that it is not multiplied by the error e(z) which has undergone the influence of the disturbance d(t).

SECOND EMBODIMENT

Figure 5:
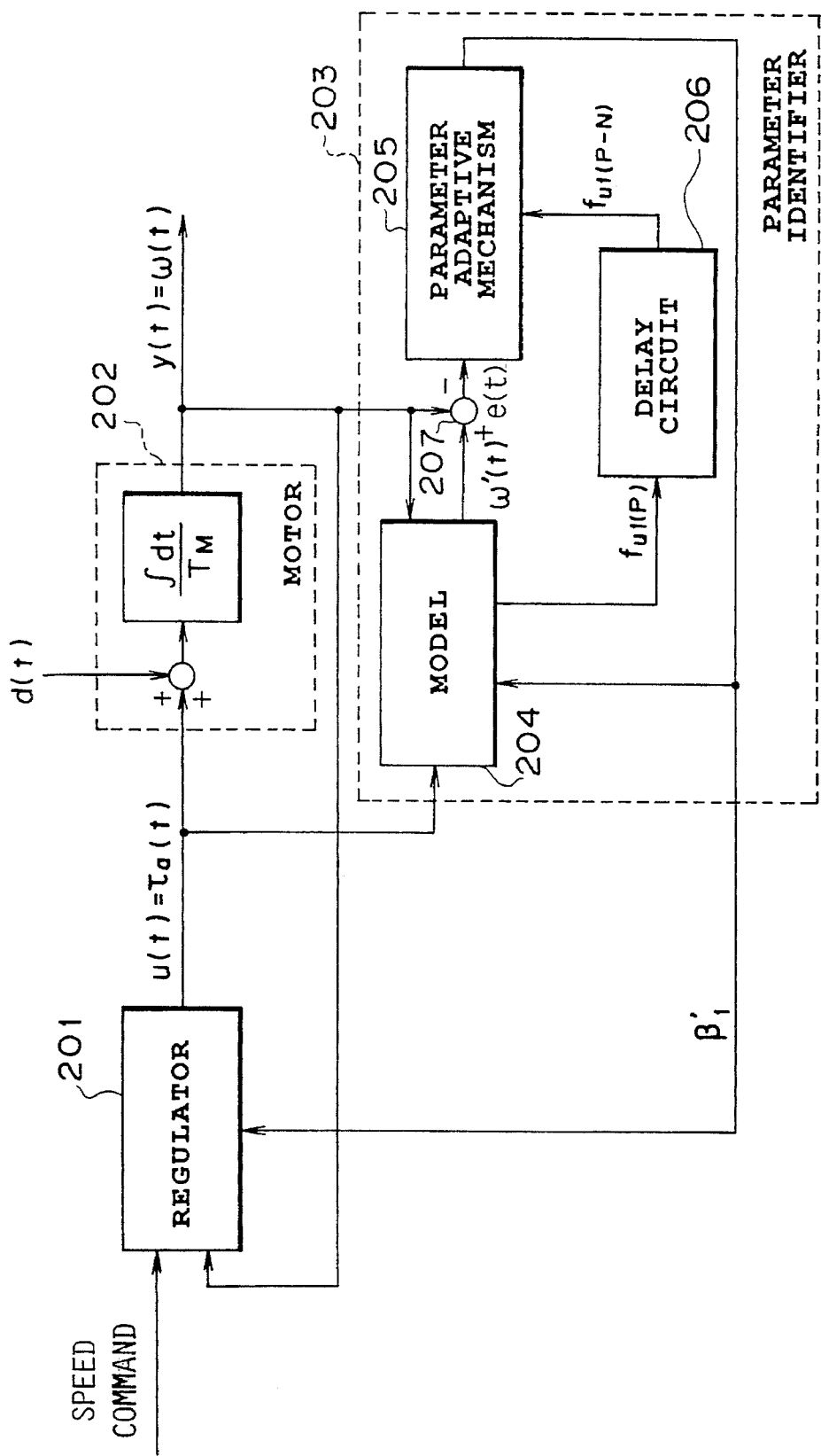
FIG. 5 is a block diagram showing a second embodiment of a parameter identifier in accordance with the present invention.

FIG. 5 shows a second embodiment of a parameter identifier in accordance with the present invention. In this embodiment, the present invention is applied to identification of a mechanical time constant (that is, the moment of inertia) of a motor. More specifically, a motor 202, that is, a plant is connected to a regulator 201 and a parameter identifier 203. The parameter identifier 203 comprises a model 204, a subtracter 207, a parameter adaptive mechanism 205, and a delay circuit 206.

Assuming that the load disturbance d(t) is given by a step function, the following state equations (22)–(26) are given.

$$\frac{d}{dt} y = \frac{1}{T_M} (u + d) \tag{22}$$

$$y = \omega \tag{23}$$

$$u = \tau_a \tag{24}$$

$$\frac{d}{dt} d = 0 \tag{25}$$

$$d = d_0 \tag{26}$$

where $\omega$ is the speed of the motor 202, and $\tau_a$ is the driving torque of the motor 202

By taking bilinear transformation of the state equation (22), equation (27) is obtained $$y(z) = \omega(z) = \frac{T}{2T_M} \cdot \frac{(z+1)}{(z-1)} \left( \tau_a + \frac{z}{z-1} d_0 \right) \tag{27}$$

$$= \frac{T}{2T_M} \cdot \frac{(z^2-1) \cdot \tau_a + (z^2+z) \cdot d_0}{(z-1)^2}$$

To obtain the structure of the model 204, equation (27) is reduced to equation (28) by dividing the denominator and numerator of the right-hand side of equation (27) by $z^2$.

$$y(z) = \frac{\frac{T}{T_M} \cdot \frac{1-z^{-2}}{2} \tau_a + \frac{T}{T_M} \cdot \frac{1+z^{-1}}{2} d_0}{1 - 2z^{-1} + z^{-2}} \tag{28}$$

By changing equation (28), the plant 202 is expressed by equation (29).

$$y(z) = \tag{29}$$

$$(2z^{-1} - z^{-2})y(z) + \frac{T}{T_M} \cdot \frac{1-z^{-2}}{2} \tau_a + \frac{T}{T_M} \cdot \frac{1+z^{-1}}{2} d_0$$

Since the unknown parameter to be obtained is $T/T_M$, the estimated output of the model 204 is expressed by equations (30) assuming that the estimated disturbance $d'_0$ is zero as in equation (31).

$$y'(z) = (2z^{-1} - z^{-2}) y(z) + \left( \frac{T}{T_M} \right)' \frac{1-z^{-2}}{2} \tau_a \tag{30}$$

$$d'_0 = 0 \tag{31}$$

Thus, the error e(z) is expressed as follows:

$$\begin{aligned} e(z) &= y'(z) - y(z) \tag{32} \\ &= \left\{ \left( \frac{T}{T_M} \right)' - \left( \frac{T}{T_M} \right) \right\} \frac{1-z^{-2}}{2} \tau_a - \\ &\quad \frac{T}{T_M} \cdot \frac{1+z^{-1}}{2} d_0 \end{aligned}$$

The state variable to be outputted from the model 204 is selected as equation (33) because the model 204 can only output the state variable required for the identification.

$$f_{u1}(z) = \frac{1-z^{-2}}{2} \tau_a \tag{33}$$

In addition, assuming that the parameter to be identified is expressed by equation (34), equation (30) to be computed by the model 204, and equation (32) of the error e(z) are changed into equations (35) and (36), respectively.

$$\beta_1 = \frac{T}{T_M} \tag{34}$$

$$y'(z) = (2z^{-1} - z^{-2})y(z) + \beta'_1 \frac{1-z^{-2}}{2} \tau_a \tag{35}$$

$$e(z) = (\beta'_1 - \beta_1) \frac{1-z^{-2}}{2} \tau_a - \beta_1 \frac{1+z^{-1}}{2} d_0 \tag{36}$$

In this embodiment, if the disturbance d(t) is applied to the system, the estimation error due to the disturbance d(t) appears in the error e(p) during the sampling intervals N beginning from the application of the disturbance d(t). Here, the number N of sampling intervals during which the impulses of disturbance appear in the error e(z) is N=2 because the order associated with $d_0$ in equation (36) is one. Accordingly, the delay circuit 206 must have the delay of two samples. Thus, the delay circuit 206 produces the delayed state variable $f_{u1(p-2)}$ having a delay of two sampling intervals with regard to the state variable $f_{u1(p-N)}$. The parameter adaptive mechanism 205, receiving the error e(t) and the delayed state variable $f_{u1(p-N)}$, calculates the parameter identification value $\beta'_1$ at the sampling interval p+1 by the following equation (37).

$$\beta'_{1(p+1)} = \beta'_{1(p)} + \Gamma_1 f_{u1(p-N)} \cdot e_{(p)} \tag{37}$$

where $\Gamma_1$ is a gain represented by a 1×1 matrix.

Finally, in FIG. 5, the plant is represented by equation (29), the model 204 is represented by equation (30), and the parameter adaptive mechanism 205 is represented by equation (37).

THIRD EMBODIMENT

Figure 6:
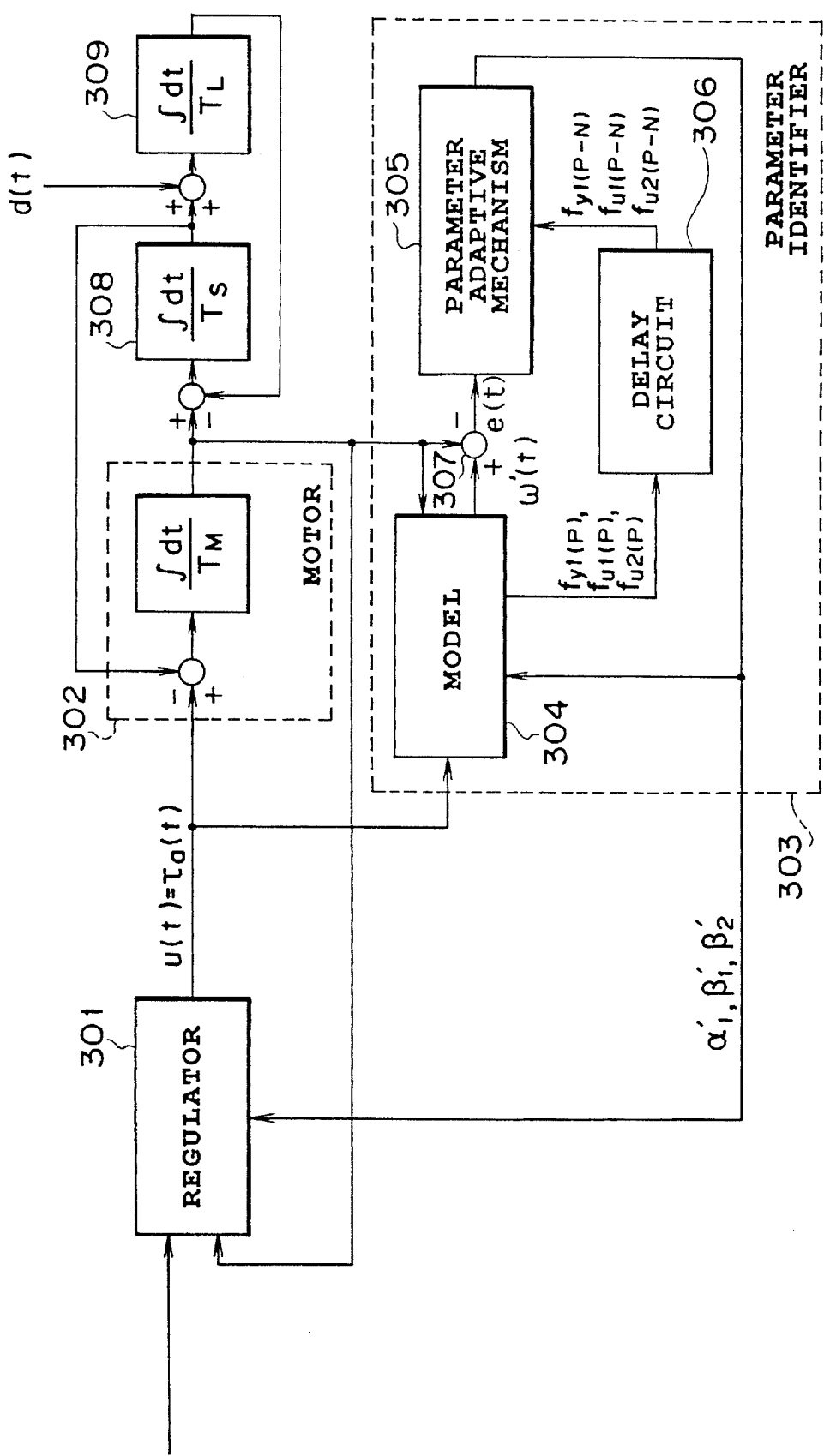
FIG. 6 is a block diagram showing a third embodiment of a parameter identifier in accordance with the present invention.

FIG. 6 shows a third embodiment of a parameter identifier in accordance with the present invention. In this embodiment, the present invention is applied to the identification of mechanical parameters of a motor control system having an elastic shaft between a motor and a load-side inertia.

In FIG. 6, a plant is a motor 302 to which a regulator 301 is connected. A parameter identifier 303, which comprises a model 304, a subtracter 307, a parameter adaptive mechanism 305 and a delay circuit 306, obtains parameters of a mechanical system consisting of the motor 302, a load-side inertia 309 and an elastic shaft 308.

The state equations of the plant are expressed by equations (38)–(42).

$$T_M \frac{d}{dt} n_M = \tau_a - \tau_s \quad (38)$$

$$T_s \frac{d}{dt} \tau_s = n_M - n_L \quad (39)$$

$$T_L \frac{d}{dt} n_L = \tau_s + d \quad (40)$$

$$y = n_M \quad (41)$$
$$u = \tau_a \quad (42)$$

where $T_M$ is the mechanical time constant of the motor 302, $T_L$ is the mechanical time constant of the load-side inertia 309, $T_s$ is the mechanical time constant of the elastic shaft 308, $\tau a$ is the driving torque of the motor 302, $\tau S$ is the shaft torque, $n_M$ is the motor speed, and $n_L$ is the load-side speed. Furthermore, it is assumed that the disturbance applied to the load-torque has a step-like transition.

Under the conditions of equations (25) and (26), the transfer characteristic of the mechanical system is expressed as equation (43), where s represents the Laplace transform operator.

$$y(s) = n_M(s) = \frac{\{s^2 + (T_L T_s)^{-1}\}\tau_a/T_M + (T_M T_s)^{-1} d/T_L}{s^3 + s(T_M^{-1} + T_L^{-1})T_s^{-1}} \quad (43)$$

By performing a bilinear transformation on equation (43), equation (44) is obtained, and equation (45) is obtained by canceling the denominator of the right-hand side of equation (44).

$$y(z) = \frac{\left\{\left(\frac{2}{T} \cdot \frac{z-1}{z+1}\right)^2 + \frac{1}{T_L T_s}\right\} \frac{\tau_a(z)}{T_M} + \frac{z}{z-1} \cdot \frac{d_0}{T_M T_L T_s}}{\left(\frac{2}{T} \cdot \frac{z-1}{z+1}\right)^3 + \frac{2}{T} \cdot \frac{z-1}{z+1} \left(\frac{1}{T_M} + \frac{1}{T_L}\right) \frac{1}{T_s}}$$

$$= \frac{\left\{\frac{T}{2}(z+1)(z-1)^3 + \frac{T^3(z+1)^3(z-1)}{8 T_L T_s}\right\} \frac{u(z)}{T_M} + \frac{T^3 z(z+1)^3 d_0}{8 T_M T_s T_L}}{(z-1)^4 + \frac{1}{4}\left(\frac{T}{T_M} + \frac{T}{T_L}\right)\frac{T}{T_s}(z+1)^2(z-1)^2}$$

$$= \frac{\left\{\frac{T}{2}(1+z)(1-Z^{-1})^3 + \frac{T^3(1+z^{-1})^3(1-z^{-1})}{8 T_L T_s}\right\} \frac{\tau_a(z)}{T_M} + \frac{T^3(1+z^{-1})^3 d_0}{8 T_M T_s T_L}}{1 - 4z^{-1} + 6z^{-2} - 4z^{-3} + z^{-4} + \frac{1}{4}\left(\frac{T}{T_M} + \frac{T}{T_L}\right)\frac{T}{T_s}(1-z^{-1})^2(1+z^{-1})^2}$$

$$\left\{1 - 4z^{-1} + 6z^{-2} - 4z^{-3} + z^{-4} + \frac{1}{4}\left(\frac{T}{T_M} + \frac{T}{T_L}\right)\frac{T}{TS}(1-z^{-1})^2(1+z^{-1})^2\right\} y(z) = \quad (45)$$

$$\left\{\frac{T}{2}(z+1)(z-1)^3 + \frac{T^3(z+1)^3(z-1)}{8 T_L T_s}\right\} \frac{u(z)}{T_M} + \frac{T^3 z(z+1)^3 d_0}{8 T_M T_s T_L}$$

By transposing the second and following terms in the braces of the left-hand side of equation (45) to the right-hand side, equation (46) is obtained.

$$y(z) = -\left\{-4z^{-1} + 6z^{-2} - 4z^{-3} + z^{-4} + \quad (46)\right.$$

$$\left. \frac{1}{4}\left(\frac{T}{T_M} + \frac{T}{T_L}\right)\frac{T}{T_s}(1-z^{-1})^2(1+z^{-1})^2 \right\} y(z) +$$

$$\left\{\frac{T}{2}(z+1)(z-1)^3 + \frac{T^3(z+1)^3(z-1)}{8 T_L T_s}\right\} \frac{u(z)}{T_M} +$$

$$\frac{T^3 z(z+1)^3 d_0}{8 T_M T_s T_L}$$

Setting $(T/T_M + T/T_L) \, T/T_s$, $T/T_M$, and $T^3/T_M T_s T_L$ as unknown parameters, an estimated value of equation (46) is expressed as equation (47) under the condition of equation (48). Estimated values and identification values are affixed with a prime.

$$y'(z) = -\left[-4z^{1-} + 6z^{-2} - 4z^{-3} + z^{-4} + \quad (47)\right.$$

$$\left\{\left(\frac{T}{T_M} + \frac{T}{T_L}\right)\frac{T}{T_s}\right\}' \frac{(1-z^{-1})^2(1+z^{-1})^2}{4} \right] y(z) +$$

$$\left\{\left(\frac{T}{T_M}\right)' \frac{(z+1)(z-1)^3}{2} + \right.$$

$$\left.\left(\frac{T3}{T_L T_s T_M}\right)' \frac{(z+1)^3(z-1)}{8} \right\} u(z)$$

$$d'_0 = 0 \quad (48)$$

By subtracting equation (46) from equation (47), equation (49) expressing the error e(z) is obtained.

$$e(z) = y'(z) - y(z) \quad (49)$$

$$= -\left[\left\{\left(\frac{T}{T_M} + \frac{T}{T_L}\right)\frac{T}{T_s}\right\}' - \left\{\left(\frac{T}{T_M} + \frac{T}{T_L}\right)\frac{T}{T_s}\right\}\right]\frac{(1-z^{-1})^2(1+z^{-1})^2}{4} y(z) +$$

$$\left\{\left(\frac{T}{T_M}\right)' - \left(\frac{T}{T_M}\right)\right\}\frac{(1+z^{-1})(1-z^{-1})^3}{2} u(z) +$$

$$\left\{\left(\frac{T^3}{T_L T_S T_M}\right)' - \left(\frac{T^3}{T_L T_S T_M}\right)\right\} \frac{(1+z^{-1})3(1-z^{-1})}{8} u(z) - \left(\frac{T^3}{T_M T_S T_L}\right) \frac{(1+z^{-1})^3 d_0}{8}$$

Parameters to be identified and state variables outputted from the model 304 are specified as equations (50)–(55), and equations (47) and (49) are rewritten as equations (56) and (57).

$$f_{y1}(z) = \frac{(1-z^{-1})^2(1+z^{-1})^2}{4} y(z) \tag{50}$$

$$f_{u1}(z) = \frac{(1-z^{-1})(1+z^{-1})^3}{2} u(z) \tag{51}$$

$$f_{u2}(z) = \frac{(1-z^{-1})(1+z^{-1})^3}{8} u(z) \tag{52}$$

$$\alpha_1 = \left(\frac{T}{T_M} + \frac{T}{T_L}\right) \frac{T}{T_S} \tag{53}$$

$$\beta_1 = \frac{T}{T_M} \tag{54}$$

$$\beta_2 = \frac{T^3}{T_M T_S T_L} \tag{55}$$

$$y'(z) = -(-4z^{-1} + 6z^{-2} - 4z^{-3} + z^{-4})y(z) - \alpha'_1 f_{y1}(z) + \{\beta'_1 f_{u1}(z) + \beta'_2 f_{y2}(z)\} \tag{56}$$

$$e(z) = -(\alpha'_1 - \alpha_1) f_{y1}(z) + (\beta'_1 - \beta_1) f_{u1}(z) + (\beta'_2 - \beta_2) f_{u2}(z) - \beta_2 \frac{(1+z^{-1})^3 d_0}{8} \tag{57}$$

where $\alpha'_1$, $\beta'_1$, and $\beta'_2$ are identified values of $\alpha_1$, $\beta_1$ and $\beta_2$.

In this embodiment, the estimated output calculated by the model 304 is given by equation (56).

Next, the delay amount of the delay circuit 306 is obtained. Since the order of delays of the disturbance $d_0$ of equation (49) or (57) is three, the number N of the sampling intervals during which the impulses caused by the disturbance appear in the error e(z) is N=4. Thus, the delay N of the delay circuit is determined at N=4 as equation (58). On the basis of this, the parameter adaptive mechanism 305 is defined by equations (59)–(61).

$$N=3+1=4 \tag{58}$$

$$\alpha'_{1(p+1)} = \alpha'_{1(p)} + \Gamma_{y1} f_{y1(p-N)} \cdot e_{(p)m} \tag{59}$$

$$\beta'_{1(p+1)} = \beta'_{1(p)} + \Gamma_{u1} f_{u1(p-N)} \cdot e_{(p)} \tag{60}$$

$$\beta'_{2(p+1)} = \beta'_{2(p)} + \Gamma_{u2} f_{u2(p-N)} \cdot e_{(p)} \tag{61}$$

where $\Gamma_{y1}$, $\beta_{u1}$ and $\Gamma_{u2}$ represent gains.

In the first to third embodiments, the parameter identifiers 103, 203 and 303 can be implemented by a microprocessor.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A parameter identifier identifying one or more parameters of an n-order plant including n state variables, said plant being subject to a known disturbance represented by an m-order impulse train, said parameter identifier comprising:

a model estimating the state variables and an output of the plant on the basis of identified parameters, and the input and output of the plant;

a subtracter calculating an error by subtracting the output of the plant from the estimated output of the plant produced from the model;

a delay circuit delaying the state variables produced from the model by N samples, where N is an integer which is not less than 1 or more than (n+m+1); and a parameter adaptive mechanism for adjusting the parameters on the basis of the delayed state variables and the error.

2. A parameter identifier identifying one or more parameters of an n-order plant including n state variables, said plant being subject to a known disturbance represented by an m-order impulse train, said parameter identifier comprising:

a model estimating the state variables and an output of the plant on the basis of identified parameters, and the input and output of the plant, said model comprising:

a first delay circuit including serially connected (n+m) delay elements, each of which delays the output of the plant by one sample;

first weighting means for obtaining (n+m) weighted linear combinations of the outputs of the delay elements of the first delay circuit, said first weighting means outputting the (n+m) weighted linear combinations as first state variables;

first linear combination means for obtaining a linear combination of the first (n+m) state variables using the parameters identified as coefficients of that linear combination;

a second delay circuit including serially connected (n+m) delay elements, each of which delays the input of the plant by one sample;

second weighting means for obtaining (n+m) weighted linear combinations of the outputs of the delay elements of the second delay circuit, said second weighting means outputting the (n+m) weighted linear combinations as second state variables;

second linear combination means for obtaining a linear combination of the second (n+m) state variables using the parameters identified as coefficients of that linear combination; and a first subtracter producing a difference between the output of the first linear combination means and the output of the second linear combination means;

a subtracter calculating an error by subtracting the output of the plant from the estimated output of the plant produced from the model;

a delay circuit delaying the state variables produced from the model by N samples, where N is an integer which is not less than 1 or more than (n+m+1); and a parameter adaptive mechanism for adjusting the parameters on the basis of the delayed state variables and the error.

3. A motor system comprising:

a motor which is subject to a load disturbance;

a parameter identifier identifying one or more parameters of the motor including n state variables, said motor being subject to a known disturbance represented by an m-order impulse train, said parameter identifier including a model estimating the state variables and an output of the plant on the basis of identified parameters, and the input and output of the plant;

a subtracter calculating an error by subtracting the output of the plant from the estimated output of the plant produced from the model;

a delay circuit delaying the state variables produced from the model by N samples, where N is an integer which is not less than 1 or more than (n+m+1); and a parameter adaptive mechanism for adjusting the parameters on the basis of the delayed state variables and the error; and a regulator producing a torque command from a speed command, the regulator modifying the torque command in accordance with the identified parameters.

4. A motor system comprising:

a motor which is subject to a load disturbance, said motor having an elastic output shaft joined to a load, and the disturbance is applied to the load;

a parameter identifier identifying one or more parameters of the motor including n state variables, said motor being subject to a known disturbance represented by an m-order impulse train, said parameter identifier including a model estimating the state variables and an output of the plant on the basis of identified parameters, and the input and output of the plant;

a subtracter calculating an error by subtracting the output of the plant from the estimated output of the plant produced from the model;

a delay circuit delaying the state variables produced from the model by N samples, where N is an integer equal to or less than (n+m+1); and a parameter adaptive mechanism for adjusting the parameters on the basis of the delayed state variables and the error; and a regulator producing a torque command from a speed command, the regulator modifying the torque command in accordance with the identified parameters.

\* \* \* \* \*